Patented June 9, 1936

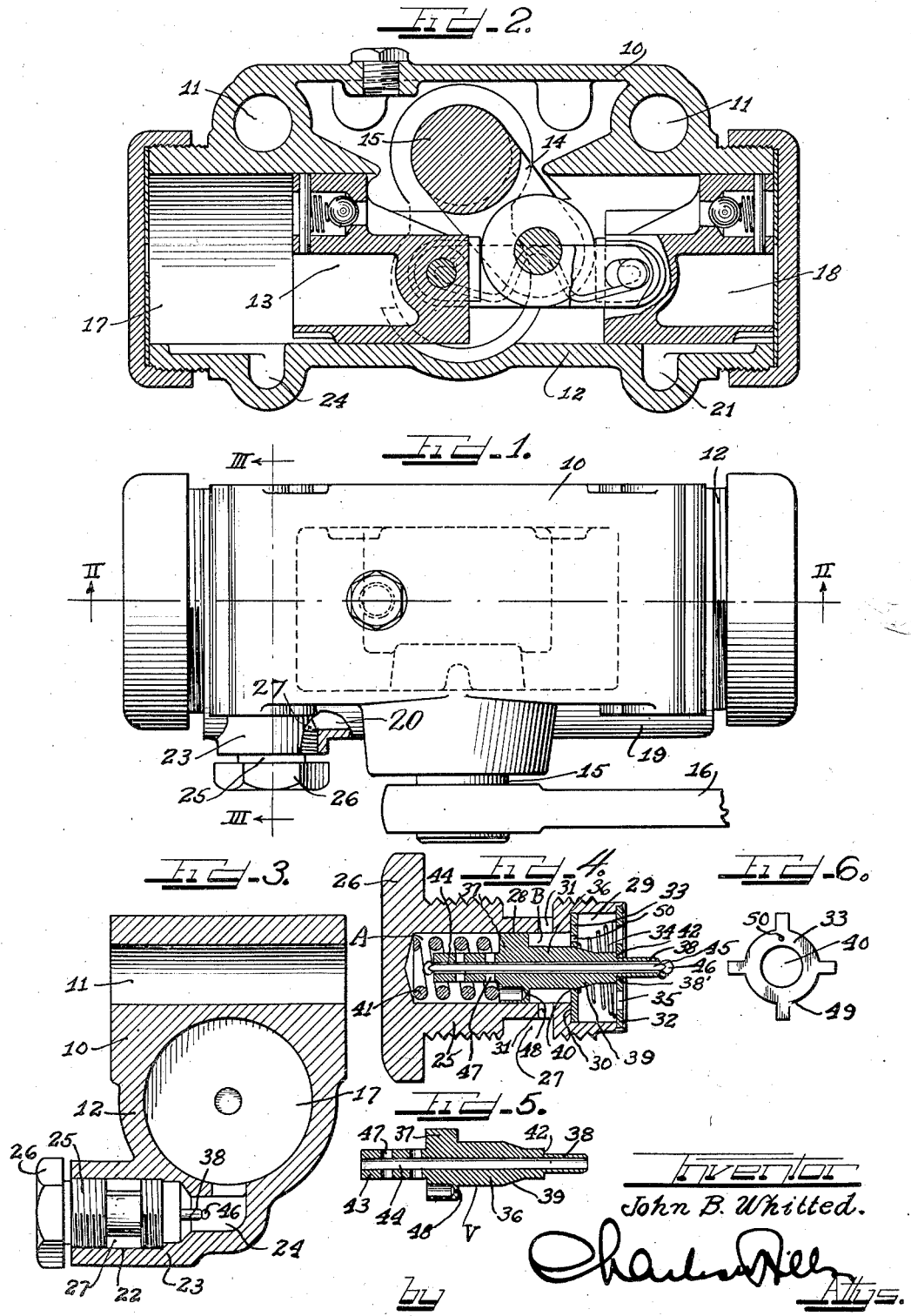

2,043,500

UNITED STATES PATENT OFFICE 2,043,500

HYDRAULIC SHOCK ABSORBER

John B. Whitted, Chicago, Ill., assignor to Houde Engineering Corporation, Buffalo, N. Y., a corporation of New York Application November 16, 1934, Serial No. 753,246

6 Claims. (Cl. 188—88)

My invention relates to hydraulic shock absorbers and particularly to improved valving structure and arrangement for metering and controlling the hydraulic fluid flow and for compensating for change in viscosity of the hydraulic fluid.

The various features of my invention will be readily apparent from the following description taken in connection with the attached drawing, in which drawing I have shown the invention applied to a type of shock absorber such as is disclosed in my co-pending application Serial No. 582,686 filed December 23, 1931.

In the drawing:

Figure 1 is a plan view of the shock absorber;

Figure 2 is a section on plane II—II of Figure 1;

Figure 3 is a section on plane III—III of Figure 1;

Figure 4 is an enlarged diametral sectional view of the valve assembly;

Figure 5 is a side elevation of one of the valve members;

Figure 6 is a side elevation of the other valve member.

The shock absorber shown comprises a casing or housing 10 having apertures 11 extending therethrough for receiving bolts by means of which the shock absorber may be attached to a vehicle. The housing 10 provides the cylinder 12 for a piston structure 13 which is reciprocated in the cylinder by a crank arm 14 extending from a shaft 15 journalled in the housing and connected at its outer end by means of a lever 16 with the vehicle axle by suitable linkage (not shown).

The piston structure with the adjacent end portions of the cylinder defines a high pressure hydraulic working chamber 17 and a low pressure hydraulic working chamber 18. A boss 19 on the outer side of the cylinder has the passageway 20 therethrough which at one end is connected by passageway 21 with the low pressure chamber 18. The other end of the passage 20 communicates with the bore 22 of the extension 23 on the housing 10. The passage 20 enters at the side of the bore, the bore end bottom being connected by passageway 24 with the high pressure chamber 17.

The valving assembly comprises a cylindrical threaded plug 25 for engaging in the threaded bore 22 of the extension 23, the plug having a polygonal end 26 by which it may be readily applied or removed from the shock absorber structure. Intermediate its ends the plug is cut away to leave the annular space 27 with which the adjacent end of the passage 20 communicates. The plug has the inner bore 28 and the outer bore 29 of larger diameter to provide a seating shoulder or ledge 30 between the bores. The inner bore 28 is connected by one or more ports 31 with the annular space 27 and therefore with the passage 20.

A disc 32 is secured in the end of the plug to form the outer wall of the bore 29. A check valve 33 in the form of a disc is movable axially in the bore 29, a spring 34 abutting the valve and the wall 32 and tending to hold the valve against the shoulder or seat 30. The end wall 32 has one or more passageways 35 which communicate with the passage 24 leading to the high pressure chamber 17.

A valve structure V comprises a cylindrical body 36 having at its inner end the cylindrical head 37 forming a plunger and fitting in the bore 28 which forms a valve chamber. The outer end 38 of the valve body is of reduced diameter and extends through a guide opening 38 in the wall 32. Intermediate its ends the valve body has the frustoconical portion 39 for cooperating with the valve port 40 in the valve disc 33. A spring 41 in the bore 28 abuts against the valve head 37 and tends to shift the valve structure V outwardly, such outward movement being limited by the engagement of the shoulder 42 on the valve with the wall 32.

The valve structure V has the extension 43 for receiving the inner end of the spring 41 and for keeping the spring axially aligned with the valve structure.

The valve structure has a capillary passageway extending axially therethrough from one end to the other. This passageway may be formed with a drill of very small diameter, but such procedure is laborious and uncertain. A passageway 44 of larger diameter is therefore provided, which passageway may be readily drilled, and to obtain the desired capillary passageway through the valve structure a wire 45 is extended through the bore 44 which wire is of less diameter than the bore to leave the desired restricted passageway. The wire may be secured against longitudinal displacement in any suitable manner as, for example, by flattening the ends thereof as indicated at 46. A number of cross ports 47 connect the inner end of the capillary passageway with the inner end A of the plug bore 28. As shown in Figure 3 the outer end of the capillary passageway is open to the passage 24 leading to the high pressure chamber 17.

A restricted orifice 48 through the valve head 37 connects the space A with the space B in the bore 28 between the valve head and the disc valve 33, this space being connected by way of the ports 31 and the annular space 27 with the passage 20 which connects with the low pressure working chamber 18. The restricted orifice may be readily provided by first drilling part way through the valve head to a large diameter and to leave a thin wall, and then drilling the orifice through this thin wall, the orifice being then of the sharp edge type whose resistance to fluid flow, during the ordinary range of temperature variations to which a shock absorber is subjected, will not be interfered with by change of the viscosity of the fluid.

The valve disc 33 may have peripheral portions cut away therefrom to leave by-passages 49 which are closed to flow when the valve disc is seated and which are open to flow when the disc is unseated. In the normal position the outer end of the cylindrical valve body 36 extends into the port 40 of the valve disc 33 and the fit may be such as to fully close the port at this time, or there may be sufficient clearance for a predetermined flow.

Describing now the operation, when the vehicle strikes an obstruction or depression in the road, the body of the vehicle swings down toward the axle, compressing the spring and also moving the shock absorber downwardly. This movement will cause the operating arm 16 to move in a counter-clockwise direction thereby swinging the crank arm 14 in counter-clockwise direction and causing the piston structure 13 to move towards the right (Figure 2). The fluid forced out of the low pressure chamber 18 will flow through the passages 21 and 20 and into the annular space 27 from where it flows through the port 31 into the space B between the valve head 37 and the valve disc 33. On account of the orifice 48 the pressure at opposite sides of the valve head will be equalized, and the pressure will be exerted against the valve disc 33 and the valve disc will be shifted away from its seat for exposure of the ports 49. Shifting of the valve disc will also move it along the frusto-conical section 39 of the valve V for further and increasing passageway for the fluid, the fluid then flowing through the passages 35 in the wall 32 and then through passage 24 into the high pressure chamber 17 in the wake of the piston.

After the vehicle body reaches the limit of its downward movement, it starts upwardly on its rebound movement under the influence of the compressed springs of the vehicle. Such upward movement will cause shifting of the piston structure toward the left (Figure 2) and the fluid will be displaced from the high pressure chamber 17 under heavy pressure. The displaced fluid flows through the passages 35 and holds the disc valve 33 firmly seated and the pressure is therefore exerted axially against the valve V to shift it inwardly for exposure of the frusto-conical section 39 in the port 40 of the valve disc so as to provide passageway for the fluid into the space B and from there to the low pressure working chamber 18. The spring 41 tends to resist the inward movement of the valve V so as to maintain proper resistance to the flow for efficient checking of the rebound movement.

During the beginning of the rebound movement some of the displaced fluid will tend to flow through the capillary passageway between the wire 45 and the wall of the bore 44 and into the space A in advance of the valve plunger head. Under ordinary temperature conditions the fluid will be of low viscosity and comparatively thin and will therefore flow readily through the capillary passageway and into the space A, and the fluid will build up pressure in the space A to counteract the pressure tending to move the valve inwardly for opening of the passage through the port 40. The building up of pressure in the space A will be interfered with by the flow of fluid from the space A through the orifice 48 and into the space B. However, the area of the orifice 48 is such, relative to the area of the capillary passageway through the valve, that sufficient counter-pressure will be built up in the space A to assist the spring 41 in controlling the valve V for the proper restriction of the flow between the valve V and the disc valve so that the proper shock absorber resistance will be maintained.

When the fluid is cold the resistance to flow through the capillary passageway is increased in accordance with the increase in the viscosity and therefore the rate of fluid flow through the capillary passageway into the space A will be less than the flow of fluid from the space A through the orifice 48 and therefore the fluid pressure against the valve will shift it further inwardly for sufficiently increased opening of the port 40 by the conical portion of the valve to compensate for the greater viscosity, the increasing of the flow passageway being in accordance with increasing viscosity so that effective operation of the shock absorber to efficiently check the spring rebound will be maintained.

Under ordinary road vibration the movement of the shock absorber piston will be comparatively slight, and where there is clearance space between the body of the valve V and the valve disc such clearance or bleed passage will take care of the displaced fluid without operation of the valve parts. Where the valve body has a close fit in the disc valve port some other bleed passage, such as a passage 50 in the valve disc, may be provided to take care of the short vibration flow.

It is evident that, instead of having the disc 33 movable and functioning as a valve, it could be stationary and serve merely as a seat for the valve structure V. In such arrangement the displaced fluid flow during compression movement of the vehicle spring would be through the clearance between the valve and the disc or through the passage 50 in the disc and the fluid flow under rebound movement of the spring would be through the same normal passages and through the increased passageway as the pressure brings the tapered portion of the valve into the seating opening 40 in the disc.

It is also evident that the valve structure disclosed can be used efficiently in types of hydraulic shock absorbers other than the type shown.

I claim as follows:

1. In hydraulic shock absorber structure, the combination of a cylinder, a piston movable in said cylinder, a by-pass for the flow of hydraulic fluid from one side of the piston to the other, a valve chamber and an inlet port thereto included in said by-pass, a valve in said valve chamber for cooperation with the inlet port to control fluid flow therethrough, yielding means tending to hold said valve in port closing position, said valve being subjected to the fluid flow to be moved by the pressure thereof for increased opening of said port, a plunger head for said valve operable in said valve chamber, a passageway for admitting fluid under pressure into said valve chamber behind said plunger head for assisting said yielding means in resisting opening movement of said valve by the fluid pressure, and a relief passageway for flow of fluid from one side of said plunger head to the other, the relative resistances to fluid flow of said passageway and said relief passage being such that said valve will be moved by the fluid pressure in accordance with variations in viscosity of the hydraulic fluid.

2. In hydraulic shock absorber structure, a cylinder for hydraulic fluid, a piston movable in said cylinder, a by-pass for the flow of displaced fluid from one side of the piston to the other, a valve chamber closed at its inner end and having a port at its outer end for metering the flow through said by-pass, a valve acting as a plunger in said valve chamber between the inner end thereof and said port, yielding means tending to hold said valve in port restricting position, the fluid flow through said by-pass tending to shift said valve for increased opening of said port, a capillary passageway for the flow of fluid under pressure to the inner end of said valve chamber for building up counter pressure against said valve tending to hold it against opening movement, the flow through said capillary passageway being dependent upon the viscosity of the fluid, and a relief passageway from one side of the valve to the other including an orifice through which the fluid flows independent of viscosity, whereby the resultant movement of said valve by fluid pressure will be in accordance with variation in the viscosity of the fluid.

3. In hydraulic shock absorber structure, a cylinder for hydraulic fluid, a piston movable in said cylinder to displace the fluid, a by-pass for the flow of displaced fluid from one side of the piston to the other, a valve chamber closed at its inner end and having a port at its outer end for metering the flow through said by-pass, a valve acting as a plunger in said valve chamber between the closed end thereof and said port and cooperable at its outer end with said port, yielding means tending to hold said valve for restricting said port, said valve having a bore therethrough and a rod of less diameter than said bore extending therethrough to provide a capillary passageway through which the fluid flow is dependent upon the viscosity of the fluid, said capillary passageway communicating at its outer end with said by-pass, the displaced fluid under pressure tending to shift said valve for increased opening of said port and part of the fluid tending to flow through said capillary passageway to the inner end of said valve chamber to establish a counter-pressure against said valve, said valve having a restricted orifice therethrough for flow of fluid from the inner end of said valve chamber to the outer end thereof, the flow through said orifice being independent of fluid viscosity, whereby the counter-pressure built up in said valve chamber to resist opening movement of said valve will be in accordance with the variation of the viscosity of the fluid.

4. In a hydraulic shock absorber structure, the combination of a cylinder providing high and low hydraulic working chambers, a piston movable in said cylinder between said chambers to displace the fluid therein, a single passageway between said chambers for the flow of fluid as said piston operates, a check valve included in said passageway for controlling the flow therethrough from the low pressure chamber to the high pressure chamber, a valve chamber included in said passageway, a valve operable as a plunger in said valve chamber and a port controlled thereby to meter the flow from the high pressure chamber to the low pressure chamber, and means for subjecting said plunger valve at opposite sides thereof to differential fluid pressure in accordance with change in viscosity of the fluid whereby said valve will be shifted by fluid pressure to meter the flow from the high pressure to the low pressure chamber in accordance with variation in viscosity of the fluid and the resistance to movement of said piston will be substantially unaffected by such variation in viscosity.

5. In a hydraulic shock absorber structure, the combination of a cylinder providing a high pressure and a low pressure hydraulic working chamber, a piston movable in said cylinder between said chambers, a single passageway for the flow of fluid between said chambers as the piston operates, a single valve assembly in said passageway comprising a check valve for permitting comparatively free flow of fluid through said passageway from the low pressure chamber to the high pressure chamber, said check valve having a port therethrough, a valve chamber in said valve assembly, a valve operable as a plunger in said valve chamber and cooperable with said check valve port to meter the flow through said passageway from the high pressure chamber to the low pressure chamber, and means for subjecting said plunger valve to differential fluid pressure at opposite sides thereof in accordance with change in viscosity of the fluid whereby said plunger valve will be operated for cooperation with said port to meter the flow from the high pressure chamber to the low pressure chamber in accordance with variations in viscosity of the fluid and the resistance to movement of said piston will be substantially unaffected by such variation in viscosity.

6. In a hydraulic shock absorber structure, the combination of a cylinder, a piston movable in said cylinder to displace hydraulic fluid therein, a passageway for the flow of the displaced fluid, a valve chamber and a port included in said passageway, a valve operable as a plunger in said valve chamber and cooperable with said port to control the flow of the displaced fluid, said valve being subjected on its inner side to the pressure of the displaced fluid tending to shift said valve for increased opening of said port, a passage for flow of part of the displaced fluid through said valve chamber for setting up counter pressure against the outer side of said valve tending to resist port opening movement thereof, a permanently open relief passage for the flow of fluid from said valve chamber at the outer side of said valve, the relative resistances of said passages being such that said valve will be moved by the fluid pressure in accordance with variations in viscosity of the hydraulic fluid.

JOHN B. WHITTED.